Patented Aug. 7, 1923.

1,464,149

UNITED STATES PATENT OFFICE.

ALEXANDER CLASSEN, OF AACHEN, GERMANY.

PROCESS FOR THE PRODUCTION OF GLOSSY-METAL COATINGS ON METALS.

No Drawing.  Application filed November 3, 1921. Serial No. 513,658.

*To all whom it may concern:*

Be it known that I, ALEXANDER CLASSEN, a German subject, and resident of Aachen, Germany, have invented certain new and useful Improvements in the Process for the Production of Glossy-Metal Coatings on Metals, of which the following is a specification.

Processes for the production of metallic coatings on metallic foundations are already known, in which colloids are added to the electrolytic bath. An investigation of the various processes in which organic or inorganic colloids are used, has shown that none of them gives results that are perfectly satisfactory. One main defect that could be detected was that they do not give uniformly dense and glossy coatings in continuous operation, and that patches and spongy places are frequently noticeable.

It has now been ascertained that these defects can be obviated and excellent results obtained if, in addition to colloids, or substances furnishing colloids bodies capable of combining the hydrogen liberated during the electrolytic process are added to the baths. For this purpose oxygeniferous substances which stand in genetic relation to hydrogen peroxide have been found suitable in particular.

The following easily reducible substances, inter alia, come under consideration by way of example.

Salt-like compounds of hydrogen peroxide with alkalis, ammonium or alkaline earths as for instance $Na_2O_2$, $(NH_4)_2O_2$, $Ba_2O_4$; also per-acids, such as persulphuric or per-monosulphuric acid (Caro's acid) and per-salts, for example percarbonates, perborates, persilicates or ortho-and pyro-perphosphates. Organic derivatives of hydrogen peroxide, for example its urea compound may also be successfully used. Finally, under certain conditions, hydrogen peroxide may be employed as such.

By the combined action of colloids and means for combining hydrogen, dense coatings which adhere well and have considerable powers of resistance can be obtained, which are in themselves, so glossy that no subsequent polishing is required. In view of the multiplicity of colloids and hydrogen-combining substances available, the desired effects can be influenced in various directions, especially as regards the degree and tint of the gloss, by a suitable selection and combination of the components.

The invention may be explained, by way of example, with reference to its application for galvanizing, for which it is admirably adapted.

To a bath for galvanizing iron containing 10.0 kg. of zinc sulphate, 2.5 kg. of ammonium sulphate and 120 cc. of sulphuric acid (1.8° Bé) per 100 litres, 100–120 grms. of alum, or suitable quantities of starch or its degradation products (dextrin, dextrose, etc.) or of albumin or its degradation products (glycocoll, semi-glutic, gelatose, hemi-collin) or of albumoses, albuminates, and so forth; together with about 120 grms. of potassium persulphate, or suitable quantities of some other agent capable of combining with hydrogen are added. The galvanizing is conducted with this bath in the usual manner, for example with a tension of about 3 volts and a current intensity of about 5 amperes per sq. decimetre. The resulting coating of zinc is distinguished by a high density, brilliant lustre and great durability. Whenever I speak of substances containing active oxygen I mean to embrace in this term any such substance which is capable of generating oxygen either by the action of other substances, or by the action of catalyzers, or by any other means, as for instance by the action of the electric current. The most well known representatives of such substances containing active oxygen are for instance the peroxides, such as sodium peroxide, or the socalled percompounds, as for instance sodium percarbonate, persulphuric acid and its salts as already mentioned above.

The process cannot be successfully operated with all reducible oxygen compounds. Thus, for example, perchloric acid and perchlorates have proved unsuitable. Similarly the desired result cannot be obtained with baths containing colloids and nitric acid as the liquid electrolyte. Tests must therefore be made in every case to ascertain which oxygen yielding substances are capable, in presence of colloids, of being so easily reducible as to prevent the undesired formation of hydrogen on the cathodes.

I claim—

1. A process for the production of glossy metal coatings on metals galvanically consisting in adding to the electrolytic bath colloids and substances easily reducible in the presence of said colloids so as to prevent the generation of hydrogen at the cathodes and conducting the galvanizing with this bath in the usual manner.

2. A process for the production of glossy metal coatings on metals galvanically consisting in adding to the electrolytic bath colloids and substances containing active oxygen, said substance being easily reducible in the presence of colloids so as to prevent the formation of hydrogen on the cathodes, and conducting the galvanizing with this bath in the usual manner.

3. A process for the production of glossy zinc coatings on metals consisting in adding to the electrolytic zinc bath colloids and substances easily reducible in the presence of said colloids so as to prevent the generation of hydrogen at the cathodes and conducting the galvanizing with this bath in the usual manner.

4. A process for the production of glossy zinc coatings on iron consisting in adding to the electrolytic zinc bath colloids and substances easily reducible in the presence of said colloids so as to prevent the generation of hydrogen at the cathodes and conducting the galvanizing of the iron objects with this bath in the usual manner.

5. A process for the production of glossy metal coatings on metals galvanically consisting in adding to the electrolytic bath substances furnishing colloids and substances easily reducible in the presence of said colloids so as to prevent the generation of hydrogen at the cathodes and conducting the galvanizing with this bath in the usual manner.

In testimony whereof I have signed my name to this specification in the presence of two subscribing witnesses.

Dr. Ing. h. i. Phil. ALEXANDER CLASSEN.

Witnesses:
 MARIA KIRSCH,
 MARIA BLEESEN.